United States Patent
Ringe et al.

(10) Patent No.: US 11,022,998 B2
(45) Date of Patent: Jun. 1, 2021

(54) OPTIMALLY DRIVING NON-UNIFORM CLOCK MESH LOADS

(71) Applicant: International Business Machines Corporation, Armonk, NY (US)

(72) Inventors: Matthias Ringe, Tuebingen (DE); Andreas H. A. Arp, Nufringen (DE); Michael V. Koch, Ehningen (DE); Fatih Cilek, Boeblingen (DE); Thomas Makowski, Pfullingen (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 18 days.

(21) Appl. No.: 16/158,601

(22) Filed: Oct. 12, 2018

(65) Prior Publication Data
US 2020/0117230 A1 Apr. 16, 2020

(51) Int. Cl.
G06F 30/39 (2020.01)
G06F 1/10 (2006.01)
G06F 30/396 (2020.01)

(52) U.S. Cl.
CPC ............... G06F 1/10 (2013.01); G06F 30/39 (2020.01); *G06F 30/396* (2020.01)

(58) Field of Classification Search
None
See application file for complete search history.

(56) References Cited

U.S. PATENT DOCUMENTS

| | | | |
|---|---|---|---|
| 7,475,374 B1 | 1/2009 | Johnson et al. | |
| 8,887,114 B2 | 11/2014 | Hill et al. | |
| 9,575,119 B1 | 2/2017 | Franch et al. | |
| 10,380,287 B1* | 8/2019 | Meyer | G06F 30/30 |
| 2007/0283305 A1* | 12/2007 | Reddy | G06F 1/10 |
| | | | 716/113 |
| 2008/0276209 A1* | 11/2008 | Albrecht | G06F 30/30 |
| | | | 716/113 |

(Continued)

OTHER PUBLICATIONS

Pinaki Chakrabarti; https://ieeexplore.ieee.org/abstract/document/6167757/; "Clock Tree Skew Minimization With Structured Routing"; Dated: Mar. 12, 2012; Retrieved: Oct. 11, 2018; 1page.

(Continued)

*Primary Examiner* — Danny Chan
(74) *Attorney, Agent, or Firm* — Cantor Colburn LLP; Margaret McNamara

(57) ABSTRACT

According to one or more embodiments of the present invention, a computer-implemented method includes determining, for a first sector from multiple sectors of a clock mesh of a semiconductor circuit, a set of mesh wires. The method further includes generating tapping point candidates, selecting a first combination of tapping points, and performing an analog electrical simulation of a clock signal. The simulation includes feeding the clock signal into the clock mesh via the first combination of tapping points via a clock signal transmitter, and measuring delays for the clock signal to reach a set of measuring nodes. The maximum delay from the measured delays is selected, and, in response to the maximum delay being less than a previous delay value, the first combination of tapping points is used to connect sector buffers from the first sector to the clock mesh.

20 Claims, 6 Drawing Sheets

(56) References Cited

U.S. PATENT DOCUMENTS

| | | | |
|---|---|---|---|
| 2014/0143746 A1* | 5/2014 | Alpert | G06F 30/367 |
| | | | 716/114 |
| 2014/0282339 A1* | 9/2014 | Hill | G06F 30/392 |
| | | | 716/122 |
| 2015/0310153 A1* | 10/2015 | Taskin | G06F 30/367 |
| | | | 716/114 |
| 2016/0203251 A1* | 7/2016 | Sunder | G06F 3/04847 |
| | | | 716/113 |
| 2017/0161421 A1* | 6/2017 | Arp | G06F 30/30 |
| 2017/0310312 A1 | 10/2017 | Arimilli et al. | |

OTHER PUBLICATIONS

V. Honkote; et al.; https://ieeexplore.ieee.org/abstract/document/5936660/; "ZEROA; Zero Clock Skew Rotary Oscillatory Array"; Dated: Jun. 30, 2011; Retrieved: Oct. 11, 2018; 1 page.

\* cited by examiner

OPTIMALLY DRIVING NON-UNIFORM CLOCK MESH LOADS

BACKGROUND

The present invention relates to synchronous/clocked digital circuits, and more specifically, to the management of clock skew by optimally driving non-uniform clock mesh loads.

Clock network design and implementation is an important step for integrated circuit (IC) design and manufacture, such as in case of a modern microprocessor, application specific integrated circuits (ASIC), and the like. Designing and implementing the clock network is a complicated process that involves clock topology construction, clock buffer insertion, local clock buffer and latch placements to meet the power, variation, and timing goals.

SUMMARY

According to one or more embodiments of the present invention, a computer-implemented method includes determining, for a first sector from multiple sectors of a clock mesh of a semiconductor circuit, a set of mesh wires. The method further includes generating tapping point candidates, selecting a first combination of tapping points, and performing an analog electrical simulation of a clock signal. The simulation includes feeding the clock signal into the clock mesh via the first combination of tapping points via a clock signal transmitter, and measuring delays for the clock signal to reach a set of measuring nodes. The maximum delay from the measured delays is selected, and, in response to the maximum delay being less than a previous delay value, the first combination of tapping points is used to connect sector buffers from the first sector to the clock mesh.

According to one or more embodiments of the present invention, a system includes a memory device, and a processor to identify optimum tapping points in a semiconductor circuit by performing a method that includes determining, for a first sector from multiple sectors of a clock mesh of a semiconductor circuit, a set of mesh wires. The method further includes generating tapping point candidates, selecting a first combination of tapping points, and performing an analog electrical simulation of a clock signal. The simulation includes feeding the clock signal into the clock mesh via the first combination of tapping points via a clock signal transmitter, and measuring delays for the clock signal to reach a set of measuring nodes. The maximum delay from the measured delays is selected, and, in response to the maximum delay being less than a previous delay value, the first combination of tapping points is used to connect sector buffers from the first sector to the clock mesh.

According to one or more embodiments of the present invention, a computer program product includes a computer readable storage medium having stored thereon program instructions executable by one or more processing devices to perform a method that includes determining, for a first sector from multiple sectors of a clock mesh of a semiconductor circuit, a set of mesh wires. The method further includes generating tapping point candidates, selecting a first combination of tapping points, and performing an analog electrical simulation of a clock signal. The simulation includes feeding the clock signal into the clock mesh via the first combination of tapping points via a clock signal transmitter, and measuring delays for the clock signal to reach a set of measuring nodes. The maximum delay from the measured delays is selected, and, in response to the maximum delay being less than a previous delay value, the first combination of tapping points is used to connect sector buffers from the first sector to the clock mesh.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Large high-performance very large scale integration (VLSI) chips have an internal clock signal that is a function of an external clock signal. This internal clock signal must be distributed to a large number of clock pins, which are specific locations or metal shapes on the chip, each of which has a known or estimated effective pin capacitance. The frequency of the clock signal determines the frequency and cycle time of the chip. Shorter cycle times result in higher chip frequency and improved chip performance.

Clock skew can limit achievable cycle time, reducing chip performance. Clock skew within a chip is the difference in time that the internal clock signal reaches various parts of the chip. Specifically, the phrase clock skew as referred to herein, is the total maximum difference in clock arrival times between any pair of the clock pins. Clock skew can also refer to a subset of clock pins, where it refers to the maximum difference in arrival times between pins in that subset. Clock skew can further be separated into two components: 1) Nominal clock skew is the expected, difference in clock signal arrival times obtained from modeling and simulation; 2) Clock uncertainty refers to the unknown and random differences in clock signal arrival times.

Because clock uncertainty is random and uncertain, statistical methods are used to predict total clock skew from the nominal clock skew and the clock uncertainty. The phrase local clock skew refers to the clock skew between any subset of nearby clock pins within a predetermined area, where the area is a fraction (<1) of the total chip size.

The nominal clock skew, if known early enough in the chip design process, can be taken into account in the chip circuit design, and does not necessarily increase cycle time. However, if this nominal skew changes significantly during the design process, it will usually cause an increase in cycle time. In addition, large nominal skew usually results in larger clock uncertainty, and clock uncertainty virtually always results in increased cycle time. Significant local clock skew is considered especially detrimental, especially if it is largely due to random clock uncertainty. Further, a technical problem of a high skew in a small area is that it could cause hold violations. The problem is worse in smaller areas because only a short distance may exist between a sending register and a receiving register. It should be noted that a hold violation cannot be fixed by a lower clock frequency.

Existing solutions for such technical problems include using a tree-driven clock network. Such tree-driven clock network is well suited to higher performance chip designs to achieve very tight clock skew and robustness with respect to process and voltage variations. Another advantage of this network is that the tree driving the grid can often be completed early in the design process, once an approximated floorplan is done and maximum expected clock load densities are estimated.

Figure 1:
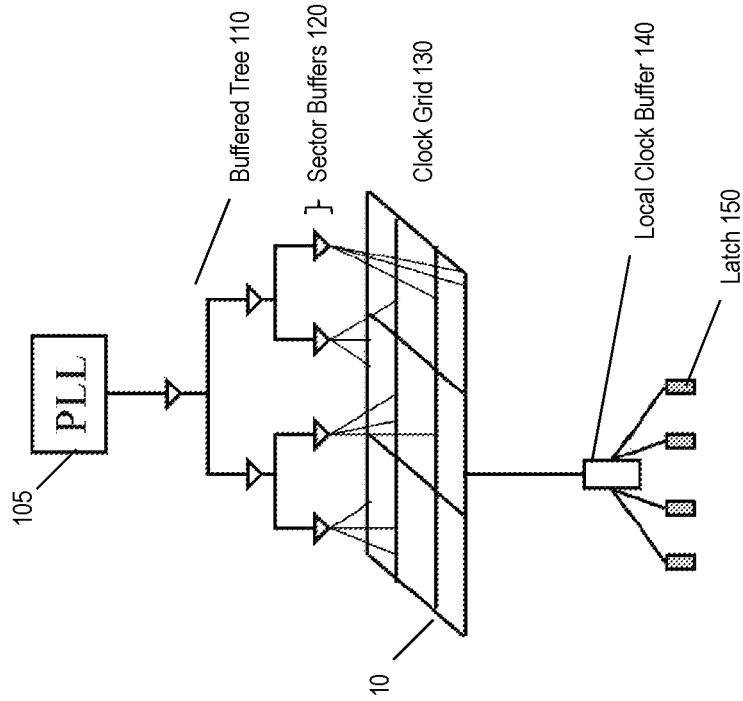
FIG. 1 depicts a tree driven grid clock network according to one or more embodiments of the present invention.

FIG. 1 depicts a tree driven grid clock network according to one or more embodiments of the present invention. A clock signal from a source phase-locked loop (PLL) 105 is first propagated through a buffered global tree 110. It should be noted that the global 'tree' may not be a strict 'tree' and can contain shorting links and/or other auxiliary circuitry. The buffers in the last level of the tree 110, are referred are to as "sector buffers" 120. The sector buffers 120 are distributed across a chip 10 (that is being designed and manufactured) and drive a clock grid 130 simultaneously. The clock grid 130 is part of the chip 10. The clock grid 130 further drives multiple local clock structures, such as local clock buffers 140. The local clock buffers 140 are connected to the clock grid via one or more latches 150.

A technical problem with the tree driven grid in this manner is that in general, each sector buffer 120 cannot drive the clock grid 130 directly, because the skews among the sector buffers 120 get translated to skews on the clock grid 130 directly, which in turn can induce extra power consumption and power clock signal quality due to competition between the sector buffers 120 in worst-case scenarios. A typical solution for such technical problem, that is to reduce this type of skew, is that each sector buffer 120 drives multiple locations on the clock grid 130 through balanced wires.

The balanced wires are then connected to the clock grid 130 at "tapping points." How to select the tapping points on the clock grid 130, the locations where the local clock buffer 140 connects to the clock grid 130, is a technical challenge. The locations directly impact the quality of the final clock network. Existing methods select the middle points on the grid wires as tapping points, and then route sector buffers to the corresponding tapping points with balanced routes. However, such methods do not consider the load distribution and lead to manual tuning and iterations of the clock network.

Compared to the global tree 110 a clock mesh has the advantage of relatively low skew due to the short-circuiting of driver outputs.

Figure 2:
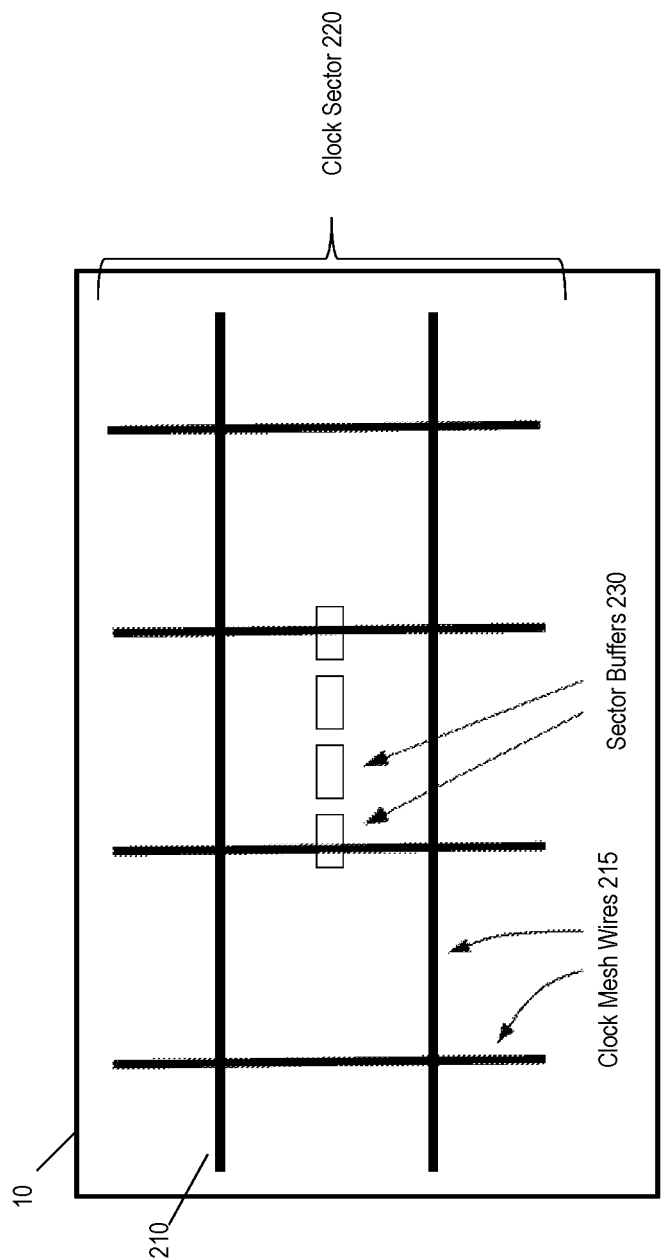
FIG. 2 depicts a clock mesh according to one or more embodiments of the present invention.

FIG. 2 depicts a clock mesh according to one or more embodiments of the present invention. In the illustration, the chip 10 is shown to include a clock mesh 210 that has clock mesh wires 215. The clock mesh wires 215 are communicatively (e.g., electrically) coupled conductors to conduct (e.g., to propagate) a clocking signal. The illustration shows a "clock sector" 220, which contains a part of the clock mesh 210 and a set of drivers called "sector buffers" 230. The entire clock mesh 210 is split into the clock sectors 220 because their reduced number of variables eases tuning. In one or more examples, a full chip clock mesh 210 can have a thousand sector buffers 230 while a clock sector 220 is limited to a predetermined number of sector buffers 230, such as four. That is, each clock sector 220 includes a predetermined number of sector buffers 230.

Figure 3:
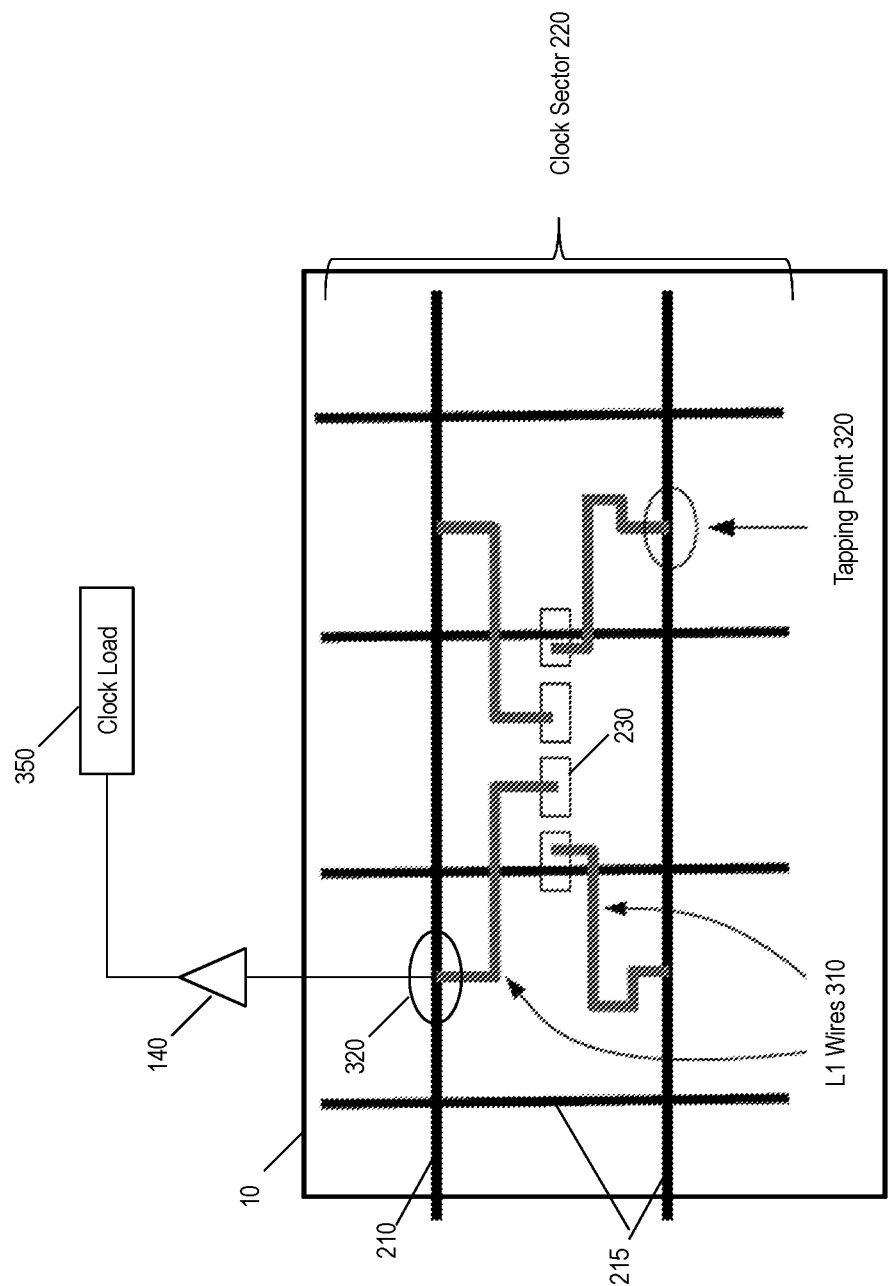
FIG. 3 depicts connections of sector buffers with a clock sector according to one or more embodiments of the present invention.

FIG. 3 depicts connections of the sector buffers 230 with the clock sector 220 according to one or more embodiments of the present invention. Each sector buffers needs one wire to connect to the clock mesh. The sector buffers 230 are connected to the clock sector 220 using "L1 wires" 310. The lengths of all L1 wires 310 of the clock sector 220 are substantially equal. The points/locations at which the L1 wires 310 connect the sector buffer 230 to the clock mesh wires 215 are the tapping points 320. The local clock buffer 140 connects and relays the clock signal conducted by the clock mesh wires 215 to one or more corresponding clock loads 350. A clock load 350 may be, for example, one or more circuits on the chip 10 that are clocked by the clock signal conducted on the clock mesh wires 215. In such fashion, the clock signal conducted by the clock mesh wires 215 is provided to the clock loads 350 on the chip 10.

As described herein, selection of the tapping points 320 is a technical problem. The technical problem is addressed by one or more embodiments of the present invention to find the optimum tapping points 320.

Even though one may build the global tree 110 and the clock grid 130 to be as regular and symmetric as possible to make the overall network robust under PVT (Power, Voltage, Temperature) variations, it is quite common to have non-uniformly distributed load on the clock grid 130. In a similar manner, the clock mesh 210 is typically a relatively regular structure, however, the clock loads can be distributed unevenly.

The examples herein are described using a clock mesh, however, one or more embodiments of the present invention can be applicable to a tree grid network 110, where a selection of the tapping points 320 is the technical challenge.

Figure 4:
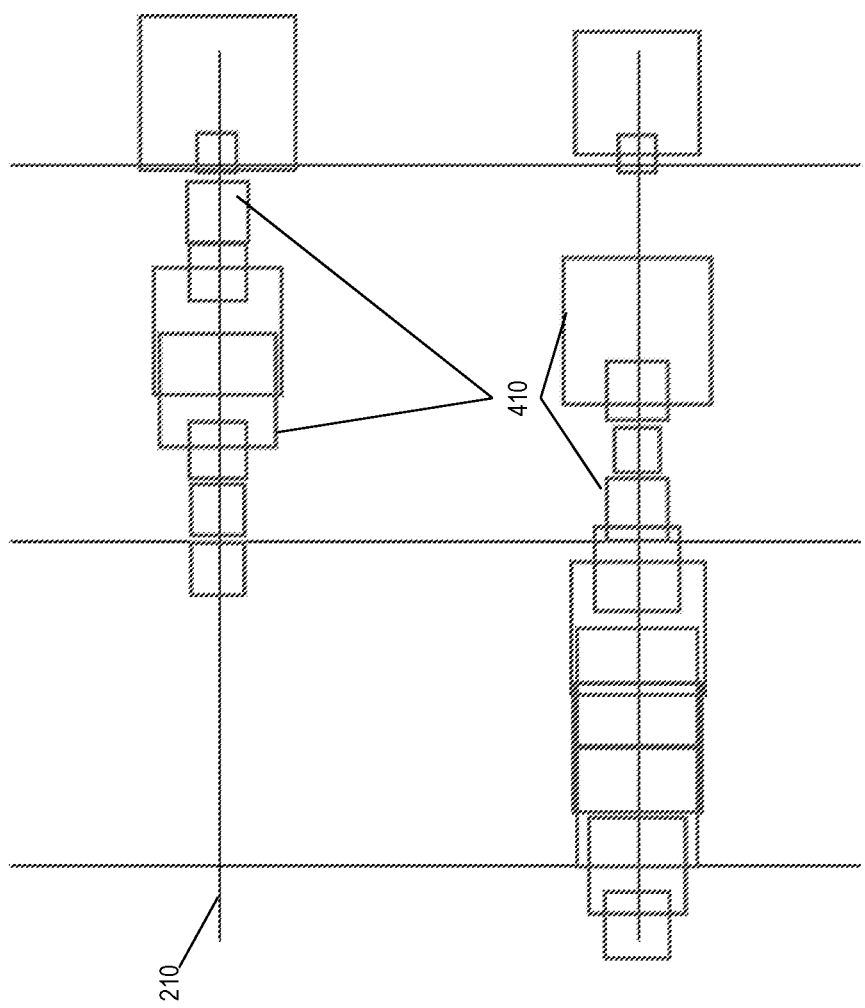
FIG. 4 depicts an example of non-uniformly distributed load on a clock grid according to one or more embodiments of the present invention.

FIG. 4 depicts an example of non-uniformly distributed load on a clock grid according to one or more embodiments of the present invention. Clock loads like the clock pins of e. g. registers, static random access memory (SRAMs), or any other such loads, are connected to the clock mesh 210. These clock loads are typically distributed unevenly. The depiction in FIG. 4 is a screenshot of a clock sector 220. The squares 410 represent respective clock loads with the size of the squares 410 being proportional to the capacitance value of the corresponding clock loads.

In the depicted example, note the absence of clock loads in the upper left corner, and a higher concentration of the clock loads in the top right corner, and the bottom left corner. It is understood that this is just one example and that the distribution of the clock loads in other examples can be different (and yet uneven).

As noted herein, the overall goal of the clock distribution is to achieve a low clock skew across all clock loads. Existing techniques include randomly choosing seed points, and then starting from the random seeds, forming clusters, which cover the entire clock sector 220. For each cluster, a tapping point 320 is chosen by minimizing the maximum Elmore delay from the tapping point 320 to all other points of the cluster. The drawback of this approach lies in the randomness: For an equal input this algorithm produces different solutions when called multiple times.

According to one or more embodiments of the present invention, the technical challenge of selecting the tapping points 320 without such randomness is addressed. According to one or more embodiments of the present invention, an exhaustive analysis of all instances of tapping points 320 is performed, an instance being one combination of tapping points 320 for the clock sector 220. The complexity of such an analysis is $\binom{n}{k}$, with n being the number of potential tapping points and k the number of sector buffers. Further, the analysis ignores inductance and extracts all wires of the clock sector 220 as resistor and capacitor only networks. This facilitates performing the analog simulations for the analysis of all instances of the tapping points 320 faster than analysis that includes the inductance values.

Figure 5:
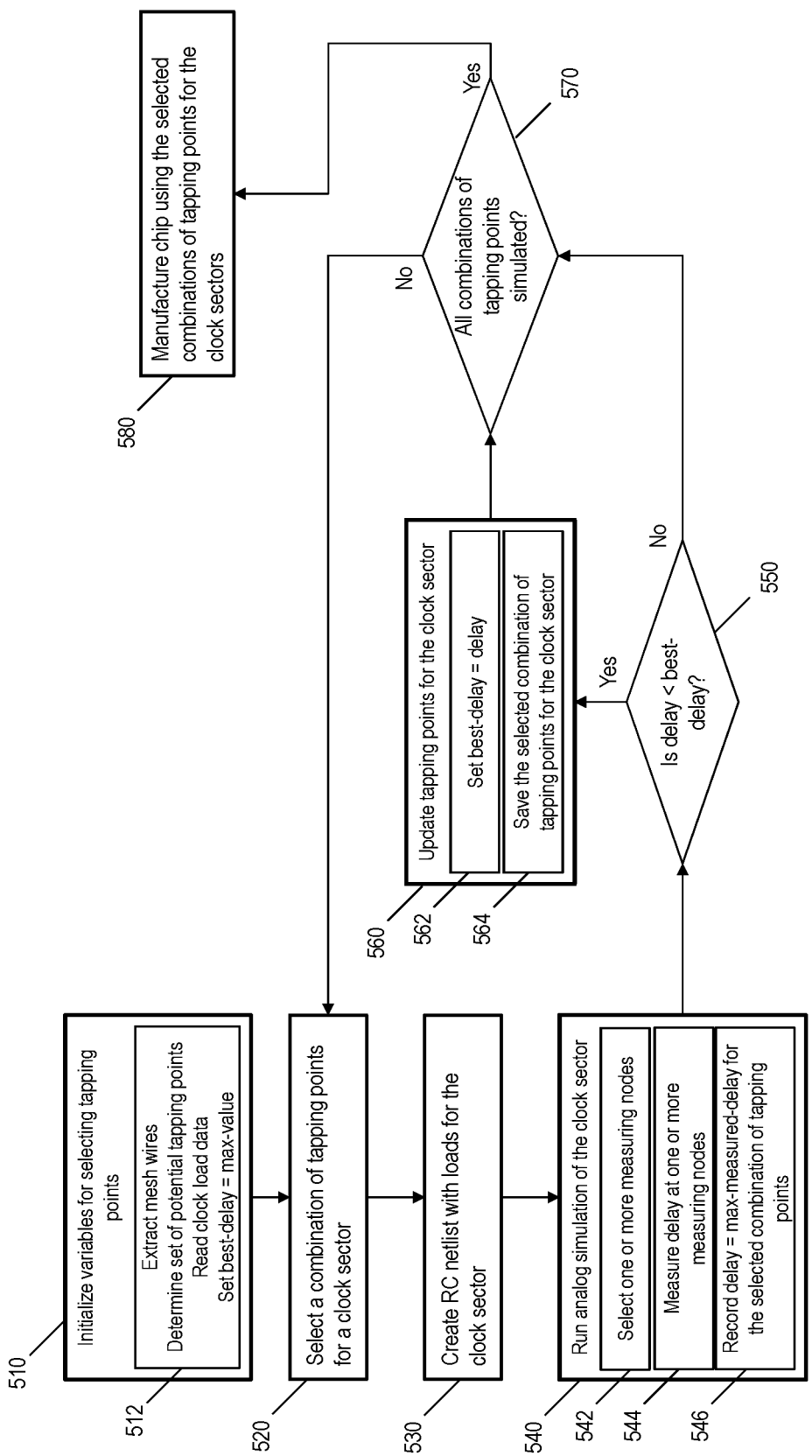
FIG. 5 depicts a flowchart of a method of selecting tapping points for the sector buffers in multiple clock sectors of a clock mesh in a chip according to one or more embodiments of the present invention.

FIG. 5 depicts a flowchart of a method of selecting tapping points for the sector buffers in multiple clock sectors of a clock mesh in a chip according to one or more embodiments of the present invention. The method includes initializing one or more variables/parameters for selecting the tapping points 320, at 510. The initialization includes extracting the locations of the clock mesh wires 215 of the clock mesh 210 of the chip 10, at 512. Such an extraction is performed from a design of the chip 10 and/or the clock mesh 210, which can be provided as electronic data, for example, a circuit design file, or any other format. The extraction further includes dividing the clock mesh 210 into multiple clock sectors 220. In one or more examples, the clock sectors 220 are determined based on predetermined criteria, such as a number of intersections among row/column wires in the mesh. For example, each clock sector 220 includes eight intersections. Alternatively, or in addition, the criteria can include a predetermined area. Any other predetermined criteria can be provided in different examples, without limiting embodiments of the present invention.

In one or more examples, the initialization further includes determining a set of potential tapping points 320 for the sector buffers 230 in the clock sector 220, at 512. The set of potential tapping points 320 can be determined using one or more known techniques based on a set of design rules provided in the chip design. For example, the design rules can provide one or more locations for the tapping points. Alternatively, or in addition, the design rules specify the width and spacing of wires in the clock sector, and accordingly different points along the clock mesh wires 215 are selected that satisfy the provided criteria. It is understood that criteria different from the examples above can be specified in other examples.

Further, the initialization can include reading the clock load data for the clock mesh 210, at 512. The clock load data provide the non-uniform clock loads 350 that the clock mesh 210 can experience during operation of the chip 10. The clock load data (see FIG. 4) can be provided as electronic data, for example, in an electronic file.

Further yet, the initialization can include setting a parameter best-delay=max-delay, the latter being a predetermined value. It is understood that the parameter names used herein are exemplary and that other names can be used without altering the operation and features of one or more embodiments of the present invention.

The method further includes selecting a first combination of tapping points 320 from the available set of tapping points for the clock sector 220, at 520. It should be noted that the clock sector 220 can be one of many and that one or more of the multiple clock sectors in the clock mesh 210 can be analyzed, as described herein, substantially simultaneously (in parallel).

The method further includes creating an RC netlist with the clock loads 350, at 530. The "RC netlist" provides a list of resistors and capacitors and their positions in the clock sector 220. Extracting the RC netlist from the electronic circuit data of the clock sector 220 can be performed using a computer program product for electronic design automation. The RC netlist, hence, provides a model the clock sector 220 of the mesh network and its connections from the sector buffers 230 through discretized resistors and capacitors thereby disregarding inductance.

Further, an analog simulation is performed for clock sector 220 using the RC netlist, and not using/accounting for any inductors in the clock sector, to measure delays (clock skews) at one or more measuring nodes in the clock sector 220, at 540. Performing the simulation includes selecting one or more measuring nodes in the clock sector 220, at 542. The measuring nodes can be intersections of the clock mesh wires 215, in one or more examples. Alternatively, or in addition, the measuring nodes can be the tapping points 320 to which the clock loads 350 are connected. In yet other cases, the measuring nodes can be a combination of the above examples.

Voltage is applied to the electronic circuit in the simulator to measure the delays at the one or more measuring nodes, at 544. To assess the selected instance (combination) of tapping points 320, the delay is measured at the measuring nodes. The delay is the arrival time for the applied voltage waveform to reach the measuring nodes, where the "arrival time" is defined as the time required for the applied voltage waveform to cross a threshold of $V_{dd}/2$ at the measuring nodes. The delay at each measuring node is measured and the maximum arrival time from the measured delays is recorded as a delay for the selected instance of tapping points 320, at 546. Accordingly, for a first combination of selected tapping points 320, delay$_{c1}$=max (measured delays at measuring nodes).

The recorded delay for the combination is compared with the best-delay parameter, at 550. If the delay for the combination is less than the present value of the best-delay, the presently selected (and simulated) set of tapping points 320 has smaller clock delays than the tapping points simulated so far. Accordingly, the method includes updating the tapping points 320 to be used for the clock sector 220, at 560. The update includes recording the delay for the presently selected combination of tapping points 320 as the best-delay, at 562. Further, the update includes saving the presently selected tapping points 320 as the tapping points 320 for the clock sector 220 during manufacture of the chip 10, at 564.

The method further includes checking if all combinations (instances) of the tapping points 320 for the clock sector 220 have been simulated in this manner, at 570. This check is also performed in case the delay for the presently selected combination of tapping points 320 exceeds the presently stored best-delay value (550). If additional combinations of tapping points 320 are possible, a next combination is selected and the above method is repeated for the clock sector 220 with the newly selected combination of tapping points 320. Once all the combinations have been analyzed in this manner, the saved tapping points 320 and best-delay (at 560) provide the optimum tapping points 320 to be used for the clock sector 220. The chip 10 is accordingly manufactured using the saved combination of tapping points 320 by connecting the sector buffers 230 at the saved tapping points 320, at 580.

Figure 6:
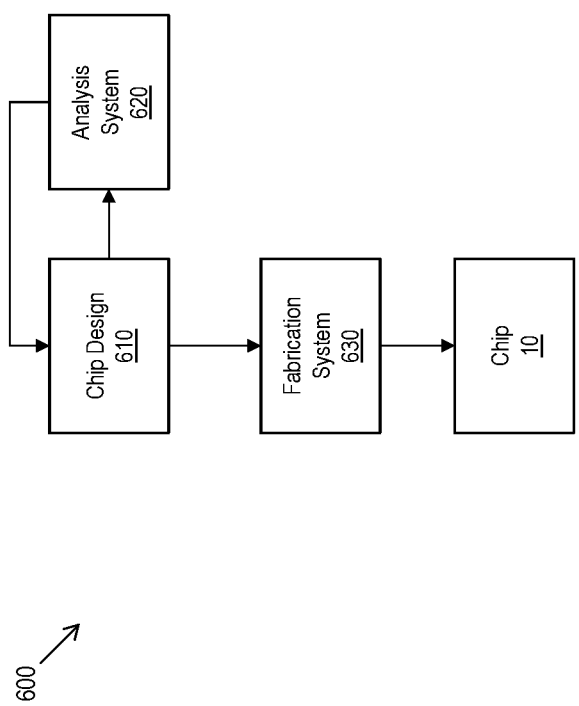
FIG. 6 depicts a block diagram of a system for manufacturing a chip with optimal tapping points in clock sectors of a clock mesh with non-uniform loads according to one or more embodiments of the present invention.

FIG. 6 depicts a block diagram of a system for manufacturing a chip with optimal tapping points in clock sectors of a clock mesh with non-uniform loads according to one or more embodiments of the present invention. The system 600 includes, among other components, a chip design 610, an analysis system 620, a fabrication system 630, and the chip 10. The chip design 610 includes the electronic circuit design for the chip, for example in an electronic format that can be used by the analysis system 620. The analysis system 620 can include a computing system that can read/edit the chip design 610 in electronic format. In one or more examples, the analysis system 620 can be a computing device such as a server computer, a workstation computer, a desktop computer, a laptop computer, a tablet computer, a phone, or any other such computing device that includes one or more processing circuits, a memory device, a storage device, one or more input/output devices and other peripheral devices.

The analysis system 620 performs the method described above and implements one or more embodiments of the present invention. The analysis system 620, in one or more examples, updates the chip design 610 with the updated tapping points 320 as described herein. The updated chip design 610 is further used by the fabrication system 630 to manufacture the chip 10. In one or more examples, the analysis system 620 and the fabrication system 630 can be part of a single system, although shown as separate blocks in FIG. 6.

Accordingly, one or more embodiments of the present invention facilitate modeling a clock sector mesh network and its connections from the sector buffers through discretized resistors and capacitors thereby disregarding inductance. The optimum tapping points are selected for each clock sector by exhaustively simulating all possible instances of L1 connections using an analog simulator. The optimum tapping points are identified by minimizing the maximum arrival time across all measuring nodes in the clock sector. The measuring nodes can be points where clock loads are connected, intersections of horizontal and vertical mesh wires, or any of the simulated nodes.

According to one or more embodiments of the present invention in an example scenario, the worst case real life sector with four sector buffers and 143 potential tapping points resulted in 16.7 million instances of tapping points to be simulated. Using the techniques described herein, such an analysis was performed in less than a day, in about eight hours. As the number of sectors reduces, the analysis time reduces drastically, for example with three sector buffers, the analysis typically takes less than 13 minutes. Accordingly, embodiments of the present invention not only improve the field of chip fabrication by facilitating selection of optimum tapping points for the sector buffers, but also improve a system that analyzes chip design to determine the optimum tapping points, such a system being rooted in computing technology.

As described herein one or more embodiments of the present invention facilitate identifying a set of tapping points within a clock mesh of a semiconductor circuit, the tapping point corresponding to an electrical connection for feeding a clock signal into the clock mesh. Identifying the optimum tapping points includes determining a set of candidate tapping points. Further, identifying the optimum tapping points includes, for multiple combinations of candidate tapping points selected from the set of candidate tapping points, performing an analog electrical simulation of a clock signal fed into the clock mesh via the tapping points, performing the electrical simulation that includes calculating a delay value describing a delay of the clock signal between a clock signal transmitter and a point within the clock mesh. The combination of candidate tapping points, the delay value of which corresponds to a minimum delay of the clock signal is identified as the set of optimum tapping points.

In one or more examples, the electrical simulation includes simulating a clock signal feeding conductor arranging from the clock signal transmitter to a simulated tapping point. Alternatively, or in addition, the simulation is based on an RC model of the feeding conductor and/or the clock mesh. In one or more examples, a set of clock buffers is assigned to a sector of the clock mesh, a clock buffer including a clock signal transmitter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, for a sector from a plurality of sectors of a clock mesh of a semiconductor circuit, a set of mesh wires that form the sector;
   generating, for the sector, a plurality of tapping point candidates, the tapping point candidates being locations on the set of mesh wires at which a plurality of sector buffers is coupled, wherein each of the sector buffers is distinct and displaced from each other sector buffers and wherein each of the sector buffers is respectively coupled to a single tapping point by an L1 wire, and a length of each L1 wire in the sector is equal;
   selecting, for the sector, a first combination of tapping points; and
   performing, for the sector, an analog electrical simulation of a clock signal comprising:
      feeding the clock signal into the clock mesh via the first combination of tapping points via a clock signal transmitter;
      measuring a plurality of delays for the clock signal to reach a plurality of measuring nodes respectively;
      selecting a maximum delay from the plurality of delays that are measured; and
      in response to the maximum delay being less than a previous delay value, using the first combination of tapping points to connect the plurality of sector buffers to the sector of the clock mesh.

2. The computer-implemented method of claim 1, wherein, in response to the maximum delay not being less than a previous delay value, selecting a second combination of tapping points and performing the analog electrical simulation of the clock signal.

3. The computer-implemented method of claim 2, wherein the previous delay value is initially set to a predetermined value.

4. The computer-implemented method of claim 1, wherein the analog electrical simulation is performed using a resistive capacitive model of the clock mesh.

5. The computer-implemented method of claim 4, wherein an inductance elements of the clock mesh are not considered when performing the analog electrical simulation.

6. The computer-implemented method of claim 1, wherein the plurality of measuring nodes comprises intersections in the clock mesh.

7. The computer-implemented method of claim 1, wherein the plurality of measuring nodes comprises points where clock loads are connected to the clock mesh.

8. A system comprising:
a memory device; and
a processor configured to identify optimum tapping points in a semiconductor circuit, the processor configured to perform a method comprising:
determining, for a first sector from a plurality of sectors of a clock mesh of a semiconductor circuit, a set of mesh wires;
generating a plurality of tapping point candidates, the tapping point candidates being locations on the set of mesh wires at which a plurality of sector buffers is coupled, wherein each of the sector buffers is distinct and displaced from each of the other sector buffers and wherein each of the sector buffers is respectively coupled to a single tapping point by an L1 wire, and a length of each L1 wire in the sector is equal;
selecting a first combination of tapping points; and
performing an analog electrical simulation of a clock signal comprising:
feeding the clock signal into the clock mesh via the first combination of tapping points via a clock signal transmitter;
measuring a plurality of delays for the clock signal to reach a plurality of measuring nodes respectively;
selecting a maximum delay from the plurality of delays that are measured; and
in response to the maximum delay being less than a previous delay value, using the first combination of tapping points to connect the plurality of sector buffers to the first sector of the clock mesh.

9. The system of claim 8, wherein, in response to the maximum delay not being less than a previous delay value, selecting a second combination of tapping points and performing the analog electrical simulation of the clock signal.

10. The system of claim 9, wherein the previous delay value is initially set to a predetermined value.

11. The system of claim 8, wherein the analog electrical simulation is performed using a resistive capacitive model of the clock mesh.

12. The system of claim 11, wherein an inductance elements of the clock mesh are not considered when performing the analog electrical simulation.

13. The system of claim 8, wherein the plurality of measuring nodes comprises intersections in the clock mesh.

14. The system of claim 8, wherein the plurality of measuring nodes comprises points where clock loads are connected to the clock mesh.

15. A computer program product comprising a computer readable storage medium having stored thereon program instructions executable by one or more processing devices to perform a method comprising:
determining, for a first sector from a plurality of sectors of a clock mesh of a semiconductor circuit, a set of mesh wires;
generating a plurality of tapping point candidates, the tapping point candidates being locations on the set of mesh wires at which a plurality of sector buffers is coupled, wherein each of the sector buffers is distinct and displaced from each of the other sector buffers and wherein each of the sector buffers is respectively coupled to a single tapping point by an L1 wire, and a length of each L1 wire in the sector is equal;
selecting a first combination of tapping points; and
performing an analog electrical simulation of a clock signal comprising:
feeding the clock signal into the clock mesh via the first combination of tapping points via a clock signal transmitter;
measuring a plurality of delays for the clock signal to reach a plurality of measuring nodes respectively;
selecting a maximum delay from the plurality of delays that are measured; and
in response to the maximum delay being less than a previous delay value, using the first combination of tapping points to connect the plurality of sector buffers to the first sector of the clock mesh.

16. The computer program product of claim 15, wherein, in response to the maximum delay not being less than a previous delay value, selecting a second combination of tapping points and performing the analog electrical simulation of the clock signal.

17. The computer program product of claim 16, wherein the previous delay value is initially set to a predetermined value.

18. The computer program product of claim 15, wherein the analog electrical simulation is performed using a resistive capacitive model of the clock mesh.

19. The computer program product of claim 18, wherein inductance elements of the clock mesh are not considered when performing the analog electrical simulation.

20. The computer program product of claim 15, wherein the plurality of measuring nodes comprises intersections in the clock mesh and points where clock loads are connected to the clock mesh.

* * * * *